G. G. EARL & A. B. WOOD.
METHOD OF REGULATING AND PROPORTIONING THE FEED OF DRY OR GRANULAR CHEMICALS IN WATER MAINS.
APPLICATION FILED MAY 3, 1916.

1,200,325.

Patented Oct. 3, 1916.
2 SHEETS—SHEET 2.

Inventors
George G. Earl
Albert B. Wood

By
J. O. Richey
His Attorney

UNITED STATES PATENT OFFICE.

GEORGE GOODELL EARL AND ALBERT BALDWIN WOOD, OF NEW ORLEANS, LOUISIANA.

METHOD OF REGULATING AND PROPORTIONING THE FEED OF DRY OR GRANULAR CHEMICALS IN WATER-MAINS.

1,200,325.  Specification of Letters Patent.  Patented Oct. 3, 1916.

Original application filed May 10, 1911, Serial No. 626,359. Divided and this application filed May 3, 1916. Serial No. 95,031.

*To all whom it may concern:*

Be it known that we, GEORGE G. EARL and ALBERT B. WOOD, both citizens of the United States, residing at New Orleans, parish of Orleans, and State of Louisiana, have invented certain new and useful Improvements in Methods of Regulating and Proportioning the Feed of Dry or Granular Chemicals to Water-Mains; and we do hereby declare the following to be a full, clear, and exact description of the invention, such as will enable others skilled in the art to which it appertains to make and use the same.

Our invention relates to a method of feeding a dry or granular chemical to a supply of water in proportion to the flow of water.

As is well known, chemicals are often employed for sterilizing or performing other functions in connection with water, and it is highly important in many instances that the dry or granular chemical fed should be in exact or substantially exact proportion to the quantity of raw water, especially where such water is to be used for drinking purposes, in order that the function of the chemical may be completely performed without leaving an excess of chemical in the water.

We aim to produce a method or process in which the supply of dry or granular chemical is automatically controlled by the fluid flow and maintained in substantially exact proportion to the flow of raw water, thereby avoiding any incomplete action of the chemical or any excess thereof left in the raw water.

Other objects of our invention and the invention itself will probably be better understood from a description of an embodiment of our invention and one set of mechanism for effecting such embodiment.

Figure 1:
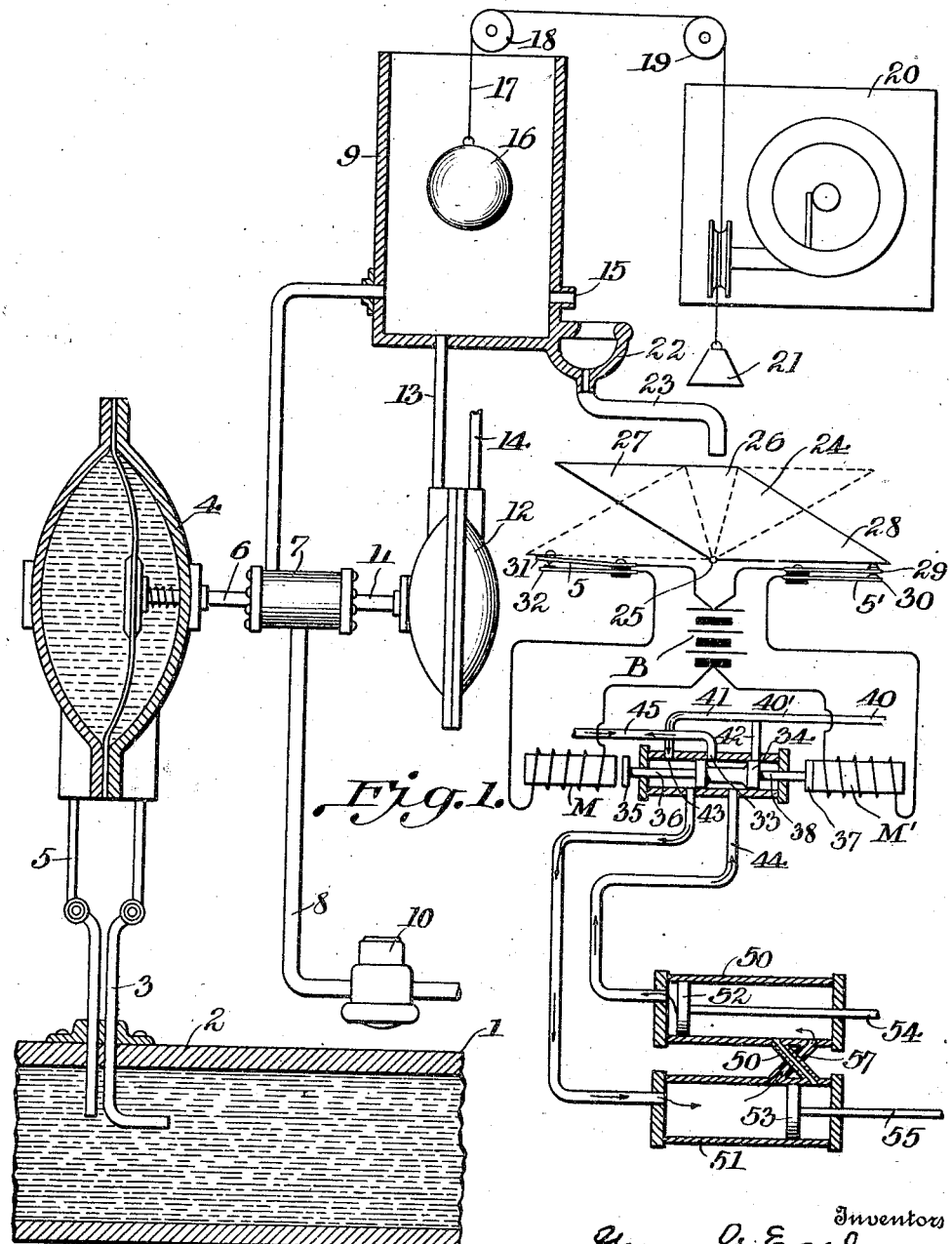
Figure 2:
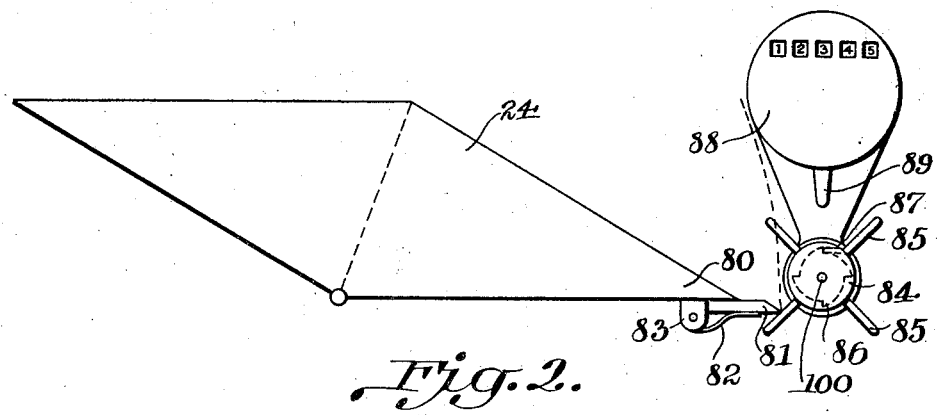
Figure 3:
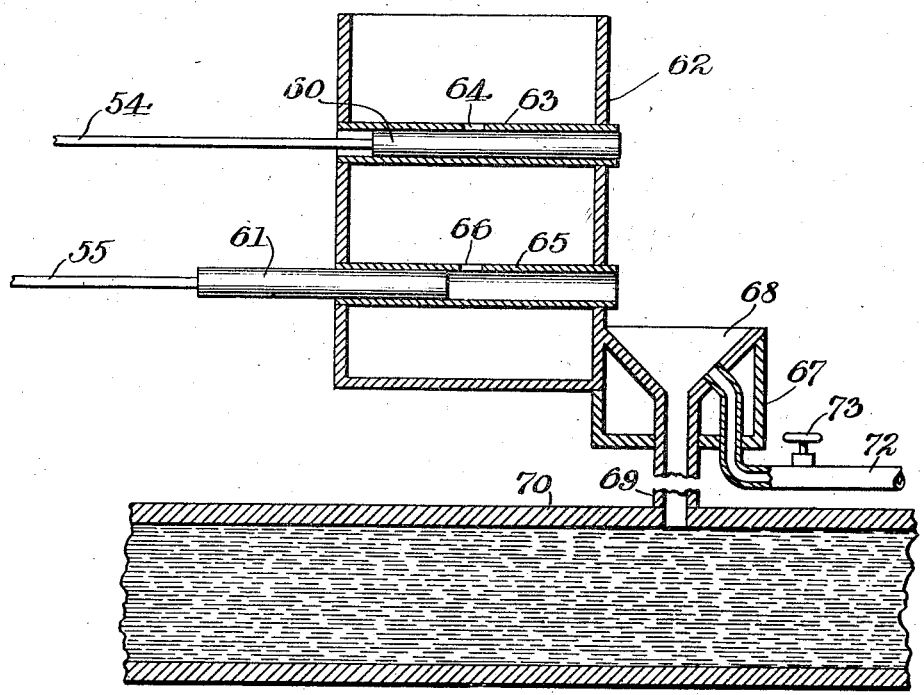

Figure 1 of the drawing shows diagrammatically a portion of the apparatus used to illustrate one embodiment of our invention. Fig. 2 shows a means for keeping check on the operation of such apparatus. Fig. 3 shows the remaining apparatus employed to illustrate an embodiment of our invention.

This application is a division of our application numbered 626,359, filed May 10, 1911.

Referring now to the drawing and to the apparatus illustrated therein at 1 is shown a water main or conduit through which water flows under pressure from a source, not shown, but which will be readily understood. At 4 is shown a chamber which is divided into two cells by a movable member $4_1$. The portion of the chamber on one side of the member $4_1$ is connected to the main 1 by a static tube 5 and a Pitot tube 2, which is connected by an intermediate duct 3. It will be appreciated that any suitable means may be employed for transmitting the pressures in the main to the movable member $4_1$. In the form shown we have illustrated the well known Pitot static tube combination. The member $4_1$ is connected to a valve in the valve casing 7 by a stem 6. The valve in the casing is a well known form of throttling valve and will be well understood from the description of the operation of the apparatus.

At 9 is shown a tank to which a duct 8 leads from the source of fluid which is not shown, but which is well understood, and which may be carried through a meter illustrated at 10. The duct 8 passes through the valve 7 into the tank 9. A second chamber is shown at 12 which is provided with a movable member similar to the member $4_1$, which is likewise connected to the valve in the casing 7 by a valve stem 11. The portion of the chamber 12 on the one side of the movable member 2 is connected by the duct 13 to the tank 9, and the portion of the chamber 12 on the other side of the movable member is connected by the duct 14 to the open air. It will be readily appreciated that the pressure of the water in the tank 9 plus the atmospheric pressure will act upon one side of the movable member and the atmospheric pressure alone act through the duct 14 on the other side of said member. A spring $6_1$ is employed to act upon the member $4_1$ in a manner which will presently appear.

An opening is provided at 15 in the tank 9 through which water flows into a basin 22 and thence through a duct 23 into one or the other of two compartments 27 and 28 of a vibratory tank 24 which is pivoted at $25$, said tank being divided at 26. The water flowing through 23 into the tank will be proportional to the water flowing through the main 1, and consequently the tank 24 will vibrate in proportion to the quantity of water flowing therethrough. The quantity of water flowing through 23 is maintained proportional to that flowing through 1, since whenever the velocity in 1 increases, the valve in 7 will be opened wider, owing to the deflection of the member $4_1$, which will move to the left until the system is balanced by an increase in head in 9 built up by the increased flow in the duct 8 into 9 resulting from the valve in 7 being opened wider. The reverse will be true when the water moves slower in the main 1. In that instance, the pressure upon the right-hand side of $4_1$ will be reduced and the static pressure will tend to move the system to the right, compressing the spring $6_1$ and reducing the opening in the pipe 8 by closing the valve 7.

As the tank 24 vibrates, it opens and closes switches in electric circuit connections. These switches are shown at $s$ and $s'$, the switch $s$ comprising the spring-mounted contacts 31 and 32 and the spring $s'$ comprising the spring-mounted contacts 29 and 30. These switches are connected by conductors with a battery B and electromagnets M and M'. The magnet M is provided with an armature 35 which is connected by a stem 36 to a valve 34 in the valve casing 33 and the magnet M' is provided with an armature 37 connected by a stem 38 to the other end of said valve. When the tank 28 is at one end of its oscillation, the switch $s'$ is closed and the magnet M' operated to move the valve to the position shown in the drawing, and when the tank is at the other extremity of its oscillation, the switch $s'$ is opened and the switch $s$ is closed, so that the valve 34 will be at the other end of its movement.

When the apparatus is in the position shown in the drawing, water flows from a source, not shown, through the duct 40—41 as indicated by the arrows, through 43, into a piston chamber 51, moving to the right, a piston 53 connected to a piston rod 55 controlling the supply of dry or granular chemical to the main, in a manner which will presently appear. When the piston 53 has reached its forward position, water passes through a duct 57 into a second piston chamber 50, moving to the left a piston 52 connected to a piston rod 54, for a purpose which will presently appear. The pressure of the water on the right-hand side of the piston 52 will expel the water from that portion of the chamber to the left of the piston 52, forcing it in the direction of the arrow through the duct 44, the valve 34 and out through the duct 45. When the valve is moved by the magnet M to its left-hand position, the operation will be reversed, the water now passing through the duct 56 from the chamber 50 to the chamber 51. The piston rods 54 and 55 are connected respectively to plungers 60 and 61 which operate respectively in barrels 63 and 65.

At 62 is shown the receptacle for the dry or granular chemical, which can readily fall from said receptacle through openings 64 and 66 respectively into the barrels 63 and 65, each time the plungers are withdrawn. When the plungers are pushed forward, the chemicals will be expelled from the barrels and will fall into a funnel 68 and thence through a duct 69 into the main. In order to insure that the chemicals will not lodge in the funnel, we provide a duct 72 controlled by the valve 73 through which we may introduce water to flush the funnel at any time and dislodge any chemicals which have not passed into the main, though these parts are not essential to the operation of my device. At 67 we show a support for the funnel.

In Fig. 2 there is shown a means for keeping check on the quantity of chemical fed. A pin 81 is mounted in a bracket 83 upon one end 80 of the tank, a spring 82 being employed to hold the pin in the position desired. A wheel is shown at 84 provided with a plurality of pins 85. A ratchet wheel 86 is fastened to the shaft 100 of the wheel 84 and prevents the main wheel returning.

88 is a registering meter and 89 a pin adapted to operate the meter, and projects into the path of the pin 85 and is moved to operate the register each time one of the pins 85 strikes it.

We have illustrated and described one embodiment of our invention and one kind of apparatus employed for effecting the same. We do not wish to be limited thereto, as many departures may be made therefrom without departing from the spirit of our invention.

We claim:—

1. A method of the class described, which consists in feeding a dry granular substance to water flowing through a water conduit and controlling the rate of feed by a second fluid flow which flows at a rate proportional to said main fluid flow in the conduit and regulating said second fluid flow so that it will be proportional to the flow of fluid in the conduit.

2. A method of the class described, which consists in moving a solid substance proportional to water flowing through a conduit and controlling the rate of movement of said substance by a second fluid flow which flows at a rate proportional to said main fluid flow in said conduit and regulating said second fluid flow so that it will be proportional to the flow of fluid in the conduit.

3. The method of moving a quantity of a substance so that the aggregate of said quantity shall bear a proportional or functional relation to the quantity of a flowing fluid, which consists in creating a separate flow of fluid, causing said separate flow to bear a proportional relation to said first named flow through the action of apparatus governed by fluid pressures derived from both of said flows and regulating the quantity of said substance moved by said separate flow.

4. The method of moving a quantity of a solid substance so that the aggregate of said quantity shall bear a proportional or functional relation to a quantity of flowing fluid, which consists in creating a separate flow of fluid, causing said separate flow to bear a proportional relation to said first-named flow through the action of apparatus governed by fluid pressures derived from both of said flows and regulating the quantity of said substance moved by said separate flow.

5. The method of moving a quantity of a solid substance so that the aggregate of said quantity shall bear a proportional or functional relation to a quantity of a flowing fluid, which consists in creating a separate flow of fluid, causing said separate flow to bear a proportional relation to said first-named flow through the action of apparatus governed by fluid pressures derived from one of said flows and regulating the quantity of said substance by said separate flow.

6. The method of moving a solid substance so that the quantity moved shall bear a functional relation to the quantity of a flowing fluid, which consists in utilizing a difference in fluid pressures which is functional to the quantity of said fluid flow to govern a separate fluid flow proportional to the quantity of said flowing fluid and governing the movement of said substance by said separate flow.

In witness whereof, we have signed our names this 25th day of April, 1916.

GEORGE GOODELL EARL.
ALBERT BALDWIN WOOD.